H. S. PARKER & E. O. LIEB.
BAGGAGE TRUCK BRAKE.
APPLICATION FILED AUG. 6, 1909.
959,251.
Patented May 24, 1910.
2 SHEETS—SHEET 1.
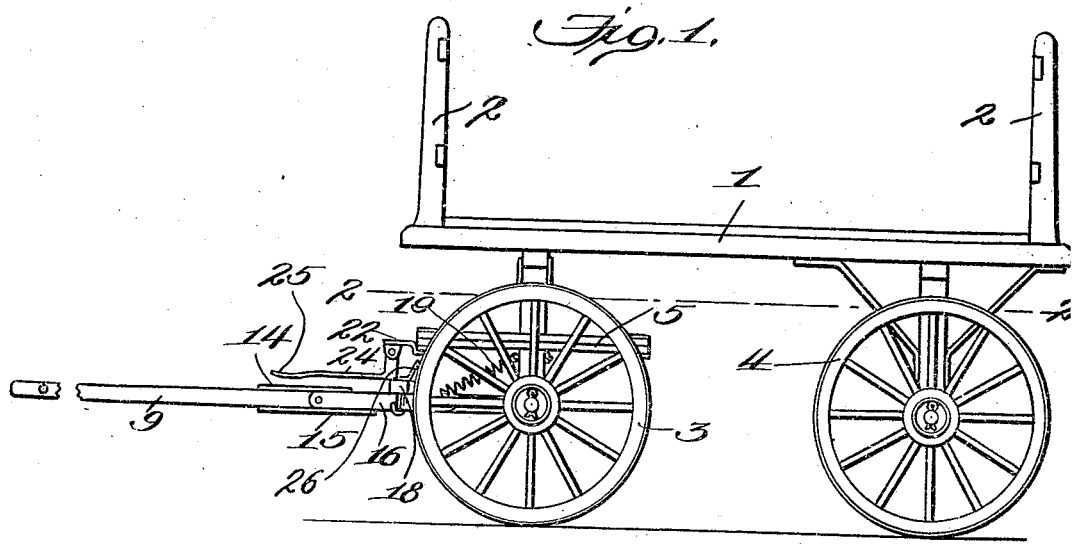
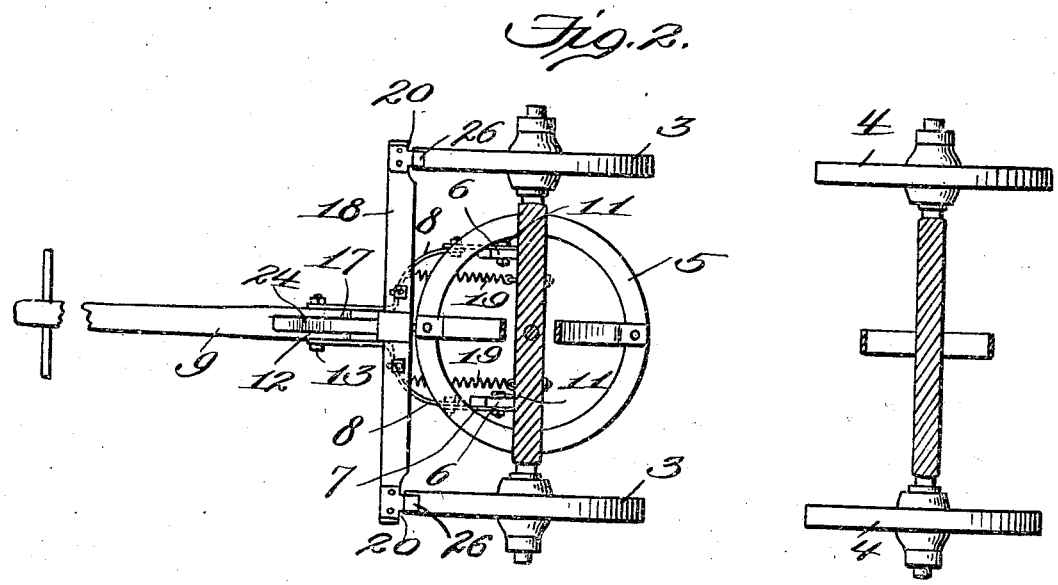
Witnesses:
Inventors
Harry S. Parker
Edward O. Lieb
By
James L. Norris
Atty.

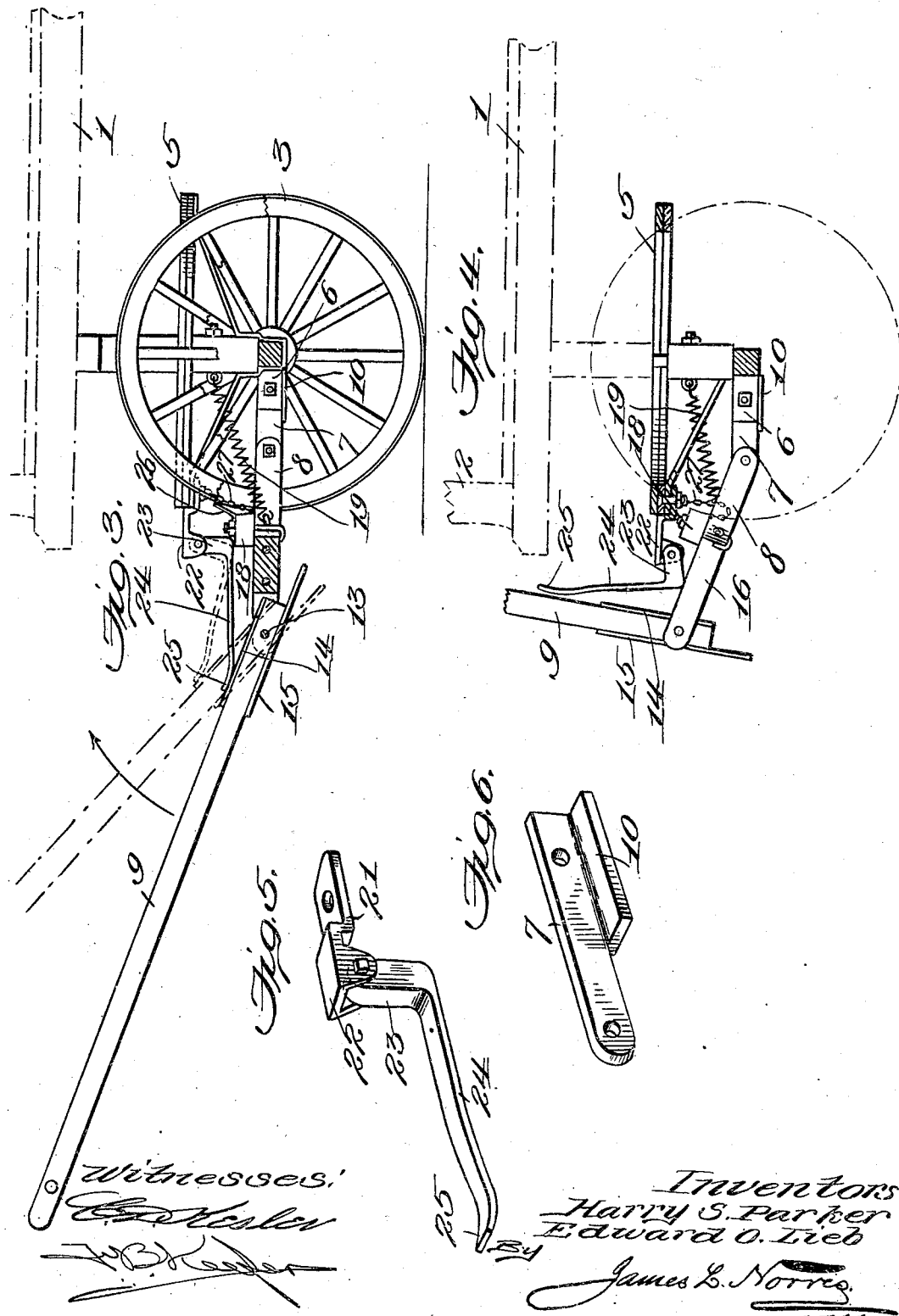

UNITED STATES PATENT OFFICE.

HARRY S. PARKER AND EDWARD O. LIEB, OF TRENTON, NEW JERSEY.

BAGGAGE-TRUCK BRAKE.

959,251. Specification of Letters Patent. Patented May 24, 1910.

Application filed August 6, 1909. Serial No. 511,575.

*To all whom it may concern:*

Be it known that we, HARRY S. PARKER and EDWARD O. LIEB, citizens of the United States, residing at Trenton, in the county of Mercer and State of New Jersey, have invented new and useful Improvements in Baggage-Truck Brakes, of which the following is a specification.

This invention relates to an improvement in brakes for vehicles, and particularly applicable to manually operated baggage trucks. It is well understood that brake mechanism embodying projecting operating levers as ordinarily used on wagons cannot be practically applied to baggage trucks as said brake levers would interfere with the quick loading and unloading of the trucks. A further objection to the use of ordinary brake mechanism on a baggage truck is, that but a single operator usually attends a truck and it would be impossible for him to apply a common brake mechanism and at the same time control the progress and guidance of the truck.

The primary object of the present invention is to provide a baggage truck with a brake device adjacent to the front wheels and controllable through the medium of the draft tongue, the brake being automatically applied when the tongue is fully released from a lowered position.

A further object of the invention is to apply to a baggage truck a brake means which is drawn out of contact with the front wheels of the truck when the tongue is lowered and the tongue locked and fully depressed to draft position so as to avoid any exertion by an attendant to hold down the tongue, the tongue being automatically released by a slight elevation thereof.

The invention embodies features of improvement on the baggage truck brake disclosed by Patent No. 849,918, granted to Harry S. Parker, March 12, 1907, and consists in the construction and arrangement of parts which will be more fully hereinafter specified.

In the drawings: Figure 1 is a side elevation of a truck embodying the features of the invention and showing the tongue fully lowered to draft position and the brake means released from the front wheels. Fig. 2 is a horizontal section on the line 2—2 of Fig. 1 looking downwardly on the running gear. Fig. 3 is a sectional side elevation of a portion of the truck showing parts in dotted lines and illustrating the draft tongue in pulling and release positions. Fig. 4 is a sectional side elevation of a portion of the truck, parts being shown in dotted lines, and illustrating the draft tongue as fully released and thrown upwardly and the brake applied to the front wheels. Figs. 5 and 6 are detail perspective views of parts of the brake mechanism.

The baggage truck brake mechanism disclosed by the patent of Harry S. Parker, hereinbefore noted, is operated by manually raising the draft tongue to apply the brake bar to the front wheels and the said bar is maintained in braking position by securing the tongue elevated through the medium of a cable, chain or other flexible means. The present improvement in baggage truck brakes embodies features whereby the draft tongue is automatically elevated when released from a certain lowered position and the brake bar applied to the front wheels of the truck and maintained in applied position without requiring any attention by the operator.

The numeral 1 designates the body or bed of a baggage truck having the usual front and rear racks 2, and a running gear comprising front and rear axles having thereon pairs of front and rear wheels 3 and 4. The front and rear axles are fixed to the bed or body through the medium of suitable bolsters as in ordinary baggage truck structures. The front axle and wheels 3 are free to swing under the bed or body and coöperate with a fifth wheel 5, and projecting forwardly from the front axle in the present instance are arms 6 to which hound clips 7, see Fig. 6, are secured and have the rear terminals of hounds 8 pivotally secured thereto and extended for a length and attached to a draft tongue 9. The clips 7 are used when it is desired to apply the brake mechanism to trucks that are already in use, and in equipping a truck with the brake mechanism during the initial construction of the said truck it is obvious that the ordinary hound organization may be used and the parts so proportioned as to render the brake mechanism operative in relation to the front wheels 3. Each of the clips 7 has a bottom flange 10 and may be reliably held in place by a single bolt 11, in view of the fact that the flange 10 bears snugly against the under side or edge of its arm 6. The forward extremities of the hounds 8 closely embrace the opposite sides of the draft tongue 9 and the latter has a brake joint or is hinged as at 12, the bolt 13 securing the front extremities of the hounds to the tongue serving as the fulcrum or pivot means for the latter. Adjacent to the brake joint or hinge portion of the tongue a metallic wear plate 14 is fixed to the movable part of the tongue and extends rearwardly to the terminal of the said part of the tongue, and on the under side of the tongue is secured a stop or limiting plate 15 which prevents the movable part of the tongue from being depressed below a horizontal plane relatively to the fixed part 16 of the tongue. The fixed part 16 of the tongue is bifurcated as at 17 and the rear extremity of the movable part of the tongue may be freely turned in the said bifurcated extremity when the movable part of the tongue is elevated above a horizontal plane. Secured on the fixed part 16 of the tongue is a brake bar or beam 18, the said brake bar or beam being immovable except with the tongue or when the latter as a whole is raised or lowered. The coupling or attaching means for the tongue as heretofore explained, is only one of a number of means that could be adopted for operatively associating the tongue and the brake mechanism with relation to the running gear, it only being necessary that the coupling means for the tongue be disposed approximately in alinement with the peripheries of the forward portions of the front wheels 3 irrespective of the particular construction of coupling means that may be selected. By this disposition of the coupling means and the brake bar or beam 18 as shown, the said bar or beam is normally held slightly in advance of the front portions of the wheels 3 so that but very little upward movement of the tongue 7 will be required to bring the rigid ends of the brake bar or beam in contact with the adjacent front portions of the said wheels 3.

The tongue and the brake bar or beam thereon as well as the hounds are all raised or elevated when the said tongue is released from its depressed draft position by springs 19 which are preferably connected to the front axle and to the hounds 8 as clearly shown by Fig. 2. When the tongue 9 and brake beam 18 are lowered to the position shown by Fig. 1 the hounds 8 are correspondingly depressed and the springs 19 are distended from a normally retracted condition and hence a spring tension is exerted on the tongue and the brake beam and hounds when the tongue is lowered and at the time that the break beam is out of contact with relation to the front wheels 3. As soon however as the draft tongue is released or the operator permits it to rise the opposite ends of the brake beam 18 are forcefully brought in contact with the front wheels 3 and a positive engagement of the ends of the brake beam is maintained with relation to the said front wheels by the springs 19 as long as the draft tongue is permitted to remain elevated and the truck is thus locked against movement by an automatic operation with material advantages in quick manipulation of the truck as required in loading and unloading baggage. As hereinbefore indicated the rigidity of the brake bar or beam 18 is an essential feature in the successful operation of the present improved truck brake, because the said brake bar is always in condition for immediate braking operation or application. This rigidity of the brake bar or beam and the minimized movement thereof required to bring it into braking position together with the location of the coupling to the running gear for the tongue approximately in alinement with the peripheries of the forward portions of the wheels 3 or so that the arcs described by the opposite extremities of the brake bar or beam will be eccentric with relation to the coupling means and cause the ends of the bar to be brought into contact with the forward portions of the wheels in planes at right angles to the latter renders it possible to bring the opposite rigid ends of the brake bar or beam with such resisting force against the wheels 3 that the forward movement of the said wheels will be instantly checked without straining the running gear, and the weight on the truck will assist in the braking operation on account of the tendency to forward movement of the truck under such weight conditions. The brake mechanism as explained, does not in the least interfere with freedom in steering or guiding the truck as the front wheels may be readily moved either to the right or left, and further it is unnecessary to dispose the front wheels squarely to the front in order to apply the brake mechanism as the brake bar or beam 18 will similarly coöperate with the front wheels when the latter are turned either to the right or left under the body of the truck. The improved mechanism may also be applied to any truck now in use by following out the particular mode of operation as hereinbefore explained.

The ends of the brake bar or beam 18 are shown as being formed with recesses 20, but it will be understood that any of the well known and approved forms of brake shoes might in some instances be used, though it is preferred that the brake bar or beam be as light as possible and unimpeded in its operation by the interposition of shoes. It will also be understood that wear plates now commonly employed may also be applied to the ends of the brake bar or beam.

The brake mechanism as thus far described may be used without the addition of any coöperating devices but it will be preferred in many instances to use means for automatically locking the draft tongue in operative position without requiring the operator to continually exert a downward pressure on the tongue to maintain the brake bar or beam out of contact with relation to the front wheels 3. To meet this contingency a fulcrum clip 21 is secured to the forward central portion of the lower member of the fifth wheel 5 and is provided with a forwardly projecting fulcrum head 22 in which the upper end of a gravitating catch 23 is pivotally mounted, the lower extremity of the said catch having a forwardly projecting trip arm 24 with an upturned free extremity 25. The head 22 projects far enough forwardly to permit the lower end of the gravity catch 23 to engage the upper side of the center of the draft bar or beam 18, and the trip arm 24 will under such conditions project forwardly over and contact with the wear plate 14 on the draft tongue when the latter is raised slightly as shown by Fig. 3 to release the gravity catch from contact with the brake bar or beam as shown in dotted lines by Fig. 3. Normally, or when the gravity catch automatically falls and engages the draft bar or beam as shown by Figs. 1 and 3, the trip arm 24 stands approximately in a horizontal plane and out of contact with the draft tongue, thereby permitting the movable part of the said tongue to be slightly raised for convenience of the operator in drawing the truck without releasing the gravity catch from its locking position. By elevating the draft tongue slightly above the plane of its operative inclination, as shown by Fig. 3 in dotted lines, the gravity catch 23 is fully released from engagement with the draft bar or beam and the springs 19 are then free to exert their retractile function and instantly elevate the rear fixed part of the tongue and brake bar or beam and force the opposite ends of the latter against the wheels 3 and under these conditions the gravity catch and its trip arm will assume the position shown by Fig. 4 and the movable part of the draft tongue may be thrown up out of the way owing to the hinge joint or the particular assemblage of the fixed and movable part thereof as hereinbefore specified. The gravity catch or locking means 23 will always be in position for self application to the brake bar or beam, and such application will ensue as soon as the brake bar or beam is lowered to a certain position without requiring any adjustment or manipulation on the part of the operator other than lowering the tongue far enough to allow the catch to freely gravitate over the brake bar or beam.

The brake bar or beam 18 has a scraper 26 secured to each free end thereof to engage the front wheels 3 as the brake bar or beam is applied, to remove snow or other matter adhering to the said wheels. A limiting chain 27 is also secured to the under portion of the rear extremity of the fulcrum clip 21 at the point where the latter is attached to the fifth wheel 5, the opposite extremity of said chain being attached to the rear portion of the brake bar or beam 18, as particularly shown by Figs. 3 and 4. The purpose of this chain 27 is to prevent the hounds and brake bar or beam together with the tongue from being lowered below a horizontal position and avoid straining the springs 19.

The dimensions of the brake bar or beam as well as the remaining coöperating parts will be made proportionate to the parts of the truck with which they are used, and as the braking mechanism is simple and comparatively inexpensive it may be applied at a minimum cost.

What is claimed is:

1. The combination with a vehicle having running gear including front wheels which may be shifted to control the direction of movement of the vehicle, of a draft tongue pivotally connected to a portion of the running gear and having a brake beam secured thereto in advance of the said front wheels, the said brake beam being continuous from end to end and of rigid structure throughout its length and uniformly movable to and from the said wheels, the draft tongue being so applied that when it is raised the brake beam will be forcefully brought against the front portions of the front wheels, and means for automatically elevating the tongue and forcefully applying the brake beam to the wheels when the tongue is released from lowered position.

2. The combination with a vehicle having running gear and front wheels mounted for shifting movement to change the direction of travel of the vehicle, of a draft tongue movably connected to the front portion of the running gear, a brake beam rigidly and directly secured on the rear end of the tongue and extending transversely across the latter and rigid from end to end, the rigid ends of the brake beam being normally slightly in advance of the front portions of the forward wheels of the vehicle, the brake beam being also in advance of the means for movably connecting the tongue to the running gear, and means for automatically elevating the brake bar or beam and forcefully applying the latter to the front portions of the wheels when the tongue is released from a lowered draft position.

3. The combination with a vehicle having a running gear with front steering wheels and a vertically movable tongue pivotally connected to said running gear, of a brake beam rigidly secured on the rear portion of the tongue in advance of the pivotal point of the tongue and out of contact with the wheels when depressed by the tongue, and means directly connected to the tongue in advance of the pivotal connection of the latter for automatically elevating the tongue and applying the brake beam to the front portion of the said wheels when the draft tongue is released from a lowered position.

4. The combination with a vehicle having a running gear with front wheels and a tongue movably connected to said running gear, of a brake bar or beam rigidly secured to the tongue and held out of engagement with relation to the wheels when the tongue is lowered, automatically operating means for locking the tongue and brake bar or beam in lowered position, the said automatically operating locking means being released by slightly elevating the tongue, and means for automatically elevating the brake bar or beam and throwing the latter in forceful contact with the wheels when the said locking means is released.

5. The combination with a vehicle having a running gear with front steering wheels and a vertically movable tongue connected to said running gear, of a brake bar or beam rigidly attached to and extending across a portion of the tongue and having rigid ends to engage the wheels when the said bar or beam is elevated, a gravitating catch to engage over the beam when the latter and the tongue are lowered, said catch having a trip arm to contact with a portion of the tongue, a part of the tongue being movable and operative to release the catch, and automatically operating means for elevating the brake bar or beam and throwing the latter into contact with the wheels when the catch is released.

6. The combination with a vehicle having front steering wheels and a vertically movable tongue, clips connected to and projecting forwardly from the axle of the said wheels, hounds attached to the clips and the tongue, the tongue being intermediately hinged so that a part thereof may be moved in relation to the remaining part, the connecting bolt for the hounds in relation to the tongue forming the pivotal means for the hinge of the latter, a brake bar or beam rigidly fixed on the rear portion of the tongue, and means for automatically elevating the brake bar or beam and the portion of the tongue on which said bar or beam is mounted to bring the ends of the latter into braking contact with the wheels when the tongue is released from a lowered draft position.

7. The combination with a vehicle having front steering wheels and a vertically movable tongue connected thereto a brake bar or beam rigidly attached to and extending across a portion of the tongue and having rigid ends to engage the wheels when the said bar or beam is elevated, a gravitating catch to engage the beam when the latter and the tongue are lowered, said catch being released by slightly elevating the tongue, and automatically operating means for elevating the brake bar or beam and throwing the latter into braking contact with the wheels when the catch is released.

8. The combination of a vehicle having a running gear with front steering wheels and a vertical movable tongue connected to said running gear and provided with an intermediate hinge so that one part of the tongue may be moved upwardly in relation to the remaining part of the same, limiting means secured to the under side of the movable part of the tongue to engage the remaining part of the said tongue and prevent depression of the movable part of the tongue below a horizontal plane, a brake bar or beam rigidly secured on the rear portion of the tongue and having rigid ends to engage the said wheels when the bar or beam is elevated, a gravitating catch to engage the beam when the tongue and the latter are lowered, the said catch having a trip arm for contact with the movable part of the tongue to release the catch from its locking position, and means for automatically elevating the brake bar or beam and causing the ends of the latter to forcefully contact with the wheels when the catch is released.

9. The combination with a vehicle having a running gear with front steering wheels and a draft tongue movably connected to said running gear, of a brake beam rigidly and directly secured to the tongue and held out of engagement with relation to the front wheels when the tongue is lowered, the brake beam being rigid from end to end and located in advance of the movable connection for the tongue, scrapers secured to the free ends of the brake beam to engage the wheels, means attached to the tongue for limiting the downward movement thereof, and means attached to the tongue in advance of the movable connection for the latter to automatically elevate and apply the brake beam to the front portions of the said wheels when the draft tongue is released from a lowered position.

In testimony whereof we have hereunto set our hands in presence of two subscribing witnesses.

HARRY S. PARKER.
EDWARD O. LIEB.

Witnesses:
ALFRED L. PARKER,
CHAS. A. REMSEN.